United States Patent [19]
Witzke et al.

[11] 4,084,043
[45] Apr. 11, 1978

[54] PHOTOGALVANIC CELL HAVING A CHARGE STORAGE LAYER WITH VARYING PERFORMANCE CHARACTERISTICS

[75] Inventors: Horst Witzke, Princeton; Satyendra Kumar Deb, East Brunswick, both of N.J.

[73] Assignees: Optel Corporation, Princeton, N.J.; Grumman Aerospace Corporation, Bethpage, N.Y.

[21] Appl. No.: 706,079

[22] Filed: Jul. 16, 1976

[51] Int. Cl.² .................. H01M 6/30; H01M 6/36
[52] U.S. Cl. .................................................. 429/111
[58] Field of Search .................. 429/111; 136/89 NB

[56] References Cited
U.S. PATENT DOCUMENTS

| | | | |
|---|---|---|---|
| 3,057,945 | 10/1962 | Rinnovatore et al. | 136/83 |
| 3,888,565 | 6/1975 | Haacke et al. | 350/160 |
| 4,037,029 | 7/1977 | Anderson | 429/111 |

OTHER PUBLICATIONS

G. Hodes et al., "Photoelectrochemical Energy Conversion & Storage Using Polycrystalline Chalcogenide Electrodes", Nature, pp. 403-404, vol. 261, June 3, 1976.

*Primary Examiner*—Aaron Weisstuch
*Attorney, Agent, or Firm*—Morris Liss; Israel Gopstein

[57] ABSTRACT

A charge storing photogalvanic cell including spaced electrode and counterelectrode "sandwiching" a charge storage layer and a compensating layer. Various dopants to the charge storage layer have been determined to vary cell performance as follows: increasing photosensitivity and charge retention; increasing electrical response; increasing device life; decreasing charge retention; changing optical absorption of charge storage layer; or localizing destruction of charge storage capability.

8 Claims, 1 Drawing Figure

PHOTOGALVANIC CELL HAVING A CHARGE STORAGE LAYER WITH VARYING PERFORMANCE CHARACTERISTICS

FIELD OF THE INVENTION

The present invention relates to photogalvanic cells and more particularly to such a cell which is capable of storing charge to operate as a battery after light is removed.

BRIEF DESCRIPTION OF THE PRIOR ART

In a co-pending patent application Ser. No. 582,344, filed May 30, 1975, by Horst Witzke which is incorporated herein by reference, a photogalvanic cell is disclosed which not only is capable of converting light energy to electrical energy but is also capable of storing charges produced during exposure to light for purposes of continuing to produce a voltage after the light is removed. Thus, the cell of the previous patent application is also capable of acting as a battery.

The FIGURE illustrates the cross sectional layer configuration on a device such as disclosed in the prior patent application. A transverse substrate such as glass 10 is covered with a transparent or translucent conducting electrode 12. Such a combination of substrate and electrode may be commercially purchased and is well known in the trade as NESA glass. The electrode 12 is covered by an additional layer 14 which stores charge. As an example of a suitable material, the aforementioned application mentions tungsten oxide ($WO_3$). The layer 14 is in turn covered with a compensating layer 16 which is in the form of a semi-solid electrolyte including compound titanium oxide ($TiO_2$). Finally, a counterelectrode 18 covers the compensating layer 16 and may be made from the element carbon. A lead 20 is connected to the conducting electrode 12 while a second lead 22 is connected to the counterelectrode layer 18. When the device shown in the FIGURE is exposed to light in the direction illustrated, there will be a conversion of light energy to electrical energy and a voltage will be created between the leads 20 and 22 which may be measured by voltmeter 26. Load 24 will then draw current. After some exposure to light, electrical charges will be stored in the charge storage layer 14. It is suspected that the charges are produced primarily in the compensating layer 16 but are primarily stored in the charge storage layer 14.

BRIEF DESCRIPTION OF THE PRESENT INVENTION

The physical structure of the present invention is basically the same as discussed in the previously mentioned co-pending patent application. However, it has been discovered that the doping of the charge storage layer 14 with preselected dopants results in improved operation of the cell. In summary, the following tabulation lists the dopants to the charge storage layer along with the improved operating capability.

| | |
|---|---|
| $MoO_3$ | increases photosensitivity and charge retention |
| $Ta_2O_5$ | increased electrical response |
| $CaF_2$ | increases device life |
| $SiO_2$ or $TiO_2$ | decreases charge retention |
| $Au_2O_3$ or $Cr_2O_3$ | changes optical absorption of charge storage layer |
| $SiO_2$, $Sb_2O_3$ or $Bi_2O_3$ | localized destruction of charge storage capability |

BRIEF DESCRIPTION OF THE FIGURE

The above-mentioned objects and advantages of the present invention will be more clearly understood when considered in conjunction with the accompanying drawing, in which:

The FIGURE illustrates in cross sectional view the layer construction of the present invention.

DETAILED DESCRIPTION OF THE INVENTION

Figure 1:
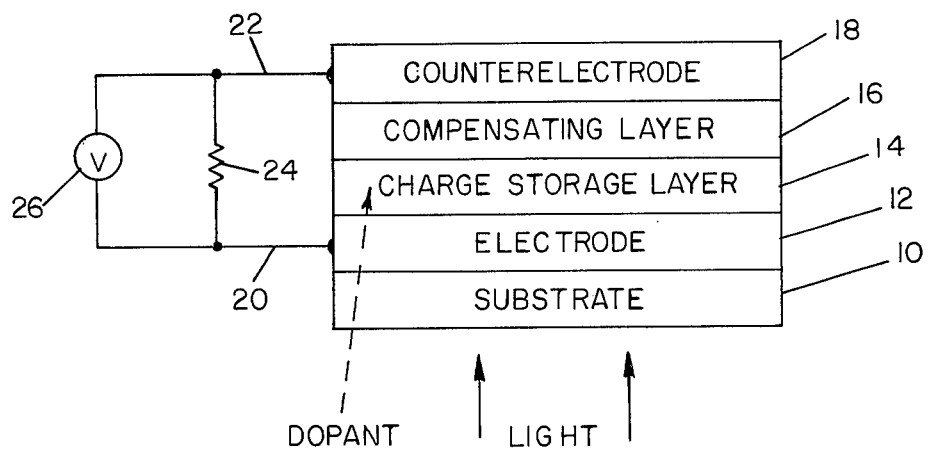

The layer structure of the present invention is the same as that of the previously mentioned co-pending application and is illustrated in FIG. 1. The principal difference resides in the introduction of impurities or dopants to the charge storage layer 14.

Increased Sensitivity and Charge Storage

By doping the storage layer 14, which is primarily comprised of tungsten oxide ($WO_3$), with the dopant molybdenum oxide ($MoO_3$), the storage layer 14 is capable of exhibiting an increase in the photosensitivity of the layer as well as charge retention by the storage layer 14. Conversely, it has been determined that by doping the $WO_3$ with silicon oxide ($SiO_2$) or titanium oxide ($TiO_2$), the charge retention of the storage layer 14 becomes decreased. Still further modification of the storage layer 14 may be made so that there is a localized destruction of the charge storage capability wherever a particular dopant is deposited. In essence, a "window" may be created in the charge storage layer where there is no charge storage, yet a periphery around the "window" in the charge storage layer 14 may exist where charge may be retained. Examples of proper dopants are considered to be antimony oxide ($Sb_2O_3$), bismuth oxide ($Bi_2O_3$) or silicon oxide ($SiO_2$). The necessary concentration of dopant to destroy the charge storage capability within a "window" may be determined by one of ordinary skill in the art by routine experimentation.

Electrical Response

By properly doping the storage layer 14, it is possible to increase the electrical response of the device. By increased electrical response, it is meant that a load 24 connected across the device will draw current more quickly. It has been determined that by doping the storage layer 14 containing tungsten oxide ($WO_3$) with tantalum oxide ($Ta_2O_5$), it is possible to achieve increased electrical response.

Increased Life

The usefulness of the present device will exist so long as successful conversion of light to electrical energy may be accomplished. Further, the useful life may be considered in terms of the ability of the device to store charges thereby acting as a battery which converts light to electrical energy for storage. The life of the device may be increased by adding a proper dopant to the storage layer 14. An appropriate dopant has been found to be calcium fluoride ($CaF_2$).

Optical Absorption Adsorption

The efficiency of the present device, in part may be considered to be a function of the optical absorption of the storage layer 14. Several dopants have been found to change the optical absorption of the charge storage layer 14. These dopants including gold oxide ($Au_2O_3$) and chromium oxide ($Cr_2O_3$) will increase the optical absorption at longer wavelengths and thereby increase the conversion efficiency of the device.

In each of the above examples, an appropriate concentration of dopant to the storage layer 14 is considered to be 10 percent on the basis of atomic weight. This criterion may not apply to the dopants for achieving localized destruction of charge storage. In the case of this latter mentioned example, routine experimentation by one of ordinary skill in the art may be required in order to achieve the discussed charge "window".

It should be understood that the invention is not limited to the exact details of construction shown and described herein for obvious modifications will occur to persons skilled in the art.

We claim the following:

1. A photogalvanic cell having charge storage capability and comprising:

first and second electrodes positioned in spaced registry from each other;

a charge storage layer covering a preselected one of said electrodes, said one electrode being light transmissive;

a compensating layer covering the other of said electrodes, the compensating layer and charge storage layer forming an interface therebetween; and a preselected dopant included in the charge storage layer for varying the normal operating characteristics of the charge storage layer and thus the cell.

2. The subject matter set forth in claim 1 wherein the dopant is a preselected metal oxide or metal fluoride.

3. The subject matter set forth in claim 1 wherein the dopant is $MoO_3$ which produces an increase in the photosensitivity and charge retention of the charge storage layer.

4. The subject matter set forth in claim 1 wherein the dopant is $Ta_2O_5$ which produces an increase in electrical response.

5. The subject matter set forth in claim 3 wherein the dopant is $CaF_2$ which produces an increase in device life.

6. The subject matter set forth in claim 1 wherein the dopant is $SiO_2$ or $TiO_2$ which produces a decrease in charge retention.

7. The subject matter set forth in claim 1 wherein the dopant is $Au_2O_3$ or $Cr_2O_3$ which produces a change in optical absorption.

8. The subject matter set forth in claim 1 wherein the dopant is $Sb_2O_3$, $Bi_2O_3$ or $SiO_2$ which produces a localized destruction of charge storage capability.

* * * * *